United States Patent
McCormick et al.

(10) Patent No.: US 9,630,258 B2
(45) Date of Patent: Apr. 25, 2017

(54) TOOL HOLDER ASSEMBLY WITH DAMPENING ELEMENTS

(71) Applicant: Kennametal Inc., Latrobe, PA (US)

(72) Inventors: Michael R. McCormick, Greensburg, PA (US); Ruy Frota de Souza Filho, Latrobe, PA (US)

(73) Assignee: KENNAMETAL INC, Latrobe, PA (US)

( * ) Notice: Subject to any disclaimer, the term of this patent is extended or adjusted under 35 U.S.C. 154(b) by 185 days.

(21) Appl. No.: 14/514,826

(22) Filed: Oct. 15, 2014

(65) Prior Publication Data

US 2016/0107242 A1    Apr. 21, 2016

(51) Int. Cl.
*B23B 31/08* (2006.01)
*B23B 31/107* (2006.01)

(52) U.S. Cl.
CPC ............ *B23B 31/08* (2013.01); *B23B 31/107* (2013.01); *B23B 31/1075* (2013.01); *B23B 2226/33* (2013.01); *B23B 2250/16* (2013.01); *Y10T 408/665* (2015.01); *Y10T 408/73* (2015.01); *Y10T 408/76* (2015.01);
(Continued)

(58) Field of Classification Search
CPC ... B23B 31/08; B23B 31/107; B23B 31/1075; B23B 2226/33; Y10T 409/304312; Y10T 409/30952; Y10T 409/309408; Y10T 408/94; Y10T 408/95; Y10T 408/9098; Y10T 408/76; Y10T 408/73;
(Continued)

(56) References Cited

U.S. PATENT DOCUMENTS 357,025 A    2/1887   Pearn
671,447 A    4/1901   Williams et al.
(Continued)

FOREIGN PATENT DOCUMENTS

CH    266434 A  *  1/1950   ............ B23B 31/08
CN    1354707 A    6/2002
(Continued)

OTHER PUBLICATIONS

German Patent Office Official Action dated Feb. 8, 2012 (no English language translation available), 5 pp.
(Continued)

*Primary Examiner* — Daniel Howell
*Assistant Examiner* — Yasir Diab
(74) *Attorney, Agent, or Firm* — Matthew S. Bedsole (57) ABSTRACT

In one aspect, tool holders employing axial sleeves and dampening elements are described herein. Tool holders described herein define a central longitudinal axis and comprise a tool holder body having a connector portion and a holder portion. The connector portion is structured to engage a rotary machine and the holder portion is disposed opposite the connector portion and has an inner diameter surface comprising a plurality of axial grooves. Tool holders described herein further comprise a tool receiver structured to receive at least a portion of a cutting tool, the tool receiver having an outer diameter surface comprising a plurality of axial grooves. The tool receiver is mounted in the holder portion so as to align the axial grooves of the inner and outer diameter surfaces and define axial sleeves filled with dampening elements.

21 Claims, 7 Drawing Sheets

(52) U.S. Cl.
CPC ........ *Y10T 408/9098* (2015.01); *Y10T 408/94* (2015.01); *Y10T 408/95* (2015.01); *Y10T 409/30952* (2015.01); *Y10T 409/304312* (2015.01); *Y10T 409/309408* (2015.01)

(58) Field of Classification Search
CPC ......... Y10T 408/665; Y10T 279/17017; Y10T 279/17025; Y10T 279/17034
See application file for complete search history.

(56) References Cited

U.S. PATENT DOCUMENTS

| | | | |
|---|---|---|---|
| 956,298 | A | 4/1910 | Cudahy et al. |
| 1,290,427 | A | 1/1919 | Velk et al. |
| 1,763,717 | A | 6/1930 | Morgan |
| 2,244,143 | A | 6/1941 | Dowler |
| 2,392,039 | A | 1/1946 | Gideon |
| 2,547,518 | A | 4/1951 | Benjamin et al. |
| 2,570,752 | A | 10/1951 | Benjamin et al. |
| 2,626,029 | A | 1/1953 | Gutterman |
| 2,791,433 | A | 5/1957 | John et al. |
| 3,343,190 | A | 9/1967 | Lutz |
| 3,663,116 | A | 5/1972 | Muller |
| 3,688,324 | A | 9/1972 | Gosman |
| 3,778,071 | A | 12/1973 | Buck |
| 3,837,758 | A | 9/1974 | Streicher |
| 4,080,090 | A | 3/1978 | Kern |
| 4,447,181 | A | 5/1984 | Asano |
| 4,491,044 | A | 1/1985 | Haas et al. |
| 4,605,349 | A | 8/1986 | Bone |
| 4,714,389 | A | 12/1987 | Johne |
| 5,033,340 | A | 7/1991 | Siefring |
| 5,538,371 | A | 7/1996 | Kubo |
| 5,716,173 | A | 2/1998 | Matsumoto |
| 5,865,575 | A | 2/1999 | Johnson |
| 5,873,687 | A * | 2/1999 | Watanabe ............. B23B 29/046 279/155 |
| 5,882,015 | A | 3/1999 | McPherson |
| 5,915,892 | A | 6/1999 | Glimpel |
| 5,975,816 | A | 11/1999 | Cook |
| 6,047,621 | A | 4/2000 | Dries et al. |
| 6,071,219 | A | 6/2000 | Cook |
| 6,082,236 | A | 7/2000 | Andreassen |
| 6,537,000 | B1 | 3/2003 | Weck |
| 6,569,022 | B2 | 5/2003 | Johnson et al. |
| 6,599,068 | B1 | 7/2003 | Miyazawa |
| 8,043,036 | B2 | 10/2011 | Cook |
| 8,118,312 | B2 | 2/2012 | Walters |
| 2001/0056013 | A1 | 12/2001 | Cook |
| 2003/0147712 | A1 | 8/2003 | Kai et al. |
| 2003/0228199 | A1 | 12/2003 | Matsumoto et al. |
| 2007/0231092 | A1 | 10/2007 | Flam |
| 2008/0260483 | A1 | 10/2008 | Cook |
| 2009/0209356 | A1 | 8/2009 | Komine et al. |
| 2010/0310333 | A1 | 12/2010 | Weber |
| 2011/0255932 | A1 | 10/2011 | Cook et al. |
| 2011/0266756 | A1 | 11/2011 | Haimer |
| 2012/0207560 | A1 | 8/2012 | Sakamaki et al. |
| 2012/0301240 | A1 | 11/2012 | Jager et al. |
| 2014/0001715 | A1 * | 1/2014 | Pappu .................... B23B 31/02 279/143 |
| 2015/0231708 | A1 * | 8/2015 | McCormick ............ B23B 31/08 279/143 |

FOREIGN PATENT DOCUMENTS

| | | |
|---|---|---|
| CN | 101076419 A | 11/2007 |
| CN | 101119821 | 2/2008 |
| CN | 101479070 | 7/2009 |
| CN | 101797651 A | 8/2010 |
| CN | 1929941 B | 10/2010 |
| DE | 918980 C | 10/1954 |
| DE | 8505616 U1 | 6/1986 |
| DE | 3835879 C1 | 1/1990 |
| DE | 68902953 T2 | 3/1993 |
| DE | 4239769 C2 | 9/1994 |
| DE | 1917835 A1 | 10/1998 |
| DE | 60205935 T2 | 6/2006 |
| DE | 102004062443 | 7/2006 |
| DE | 19982996 B4 | 1/2008 |
| EP | 0051097 A1 | 5/1982 |
| JP | 58202720 A | 11/1983 |
| RU | 1780942 A1 | 12/1992 |
| SU | 643254 A | 1/1979 |
| SU | 664756 A | 5/1979 |
| SU | 1061943 A | 12/1983 |
| SU | 1094680 A | 5/1984 |
| SU | 1212713 A | 2/1986 |
| SU | 1281347 A | 1/1987 |
| SU | 1342615 A | 10/1987 |
| SU | 1750859 A1 | 7/1992 |
| WO | 2011136463 | 11/2011 |

OTHER PUBLICATIONS

Non-Final Rejection dated Nov. 18, 2014.
Jun. 5, 2014—Non-Final Office Action—U.S. Appl. No. 13/538,337.
Mar. 6, 2015—Third_Office_Action—DE102013106589.9 and English translation.
Sep. 1, 2015—First_Office_Action—CN20121015857.9 and English translation.
May 4, 2016—Second_Office_Action—CN201210158571.9.
Jun. 23, 2016—First Office Action.

* cited by examiner

TOOL HOLDER ASSEMBLY WITH DAMPENING ELEMENTS

FIELD

The present invention relates to tool holder assemblies and, in particular, tool holder assemblies employing one or more dampening elements.

BACKGROUND

Rotational machining operations, such as milling, boring, reaming and deburring generally utilize a rotating spindle for interfacing with cutting tools having a variety of designs and geometries. In order to securely retain such tools, tool holders are often provided with adapters suitable for receiving a multiplicity of differently sized and/or shaped tool shanks. Tool adapters, for example, can be used to facilitate rapid replacement of differing tool shank geometries or sizes leading to cutting operation efficiencies. However, such configurations generally introduce metal-to-metal contact surfaces capable of generating undesirable wear and vibrations during cutting operations. Vibrations induced during a cutting operation can shorten tool life and/or reduce workpiece surface finish. Transfer of vibrational resonance into a tool holder can also, in certain cases, result in an unsecure coupling between the cutting tool and the tool holder.

Tool holder assemblies, therefore, must be capable of accurately and securely retaining a tool while minimizing detrimental effects of vibration and wear during a machining operation. Various mechanisms and configurations have been developed for securing cutting tools into tool holder assemblies, but such configurations present deficiencies in minimization of vibration, simplification of design and scalability of design. Tool holder design continues to evolve in response to the changing demands of rotational cutting, milling and boring applications, thereby calling for the development of new assemblies and associated methods of assembling tool holders.

SUMMARY

In one aspect, tool holder assemblies are described herein comprising a tool holder body and a tool receiver defining a plurality of axial sleeves filled with dampening elements. For example, a tool holder assembly described herein defines a central longitudinal axis and comprises a tool holder body having a connector portion and a holder portion. The connector portion is structured to engage a rotary machine and the holder portion is disposed opposite the connector portion and has an inner diameter surface comprising a plurality of axial grooves. A tool holder assembly further comprises a tool receiver structured to receive at least a portion of a cutting tool, the tool receiver having an outer diameter surface comprising a plurality of axial grooves. The tool receiver is mounted in the holder portion so as to align the axial grooves of the inner and outer diameter surfaces and define axial sleeves filled with dampening elements.

In another aspect, methods of assembling a tool holder having a central longitudinal axis are described herein. A method described herein comprises providing a tool holder body having a connector portion and a holder portion. The connector portion is structured to engage a rotary machine and the holder portion is disposed opposite the connector portion and has an inner diameter surface comprising a plurality of axial grooves. A tool receiver structured to receive at least a portion of a cutting tool is provided, the tool receiver having an outer diameter surface comprising a plurality of axial grooves. The tool receiver is mounted in the holder portion so as to align the axial grooves of the inner and outer diameter surfaces and define axial sleeves, wherein the axial sleeves are filled with dampening elements.

DETAILED DESCRIPTION

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

I. Tool Holder Assemblies

Figure 1:
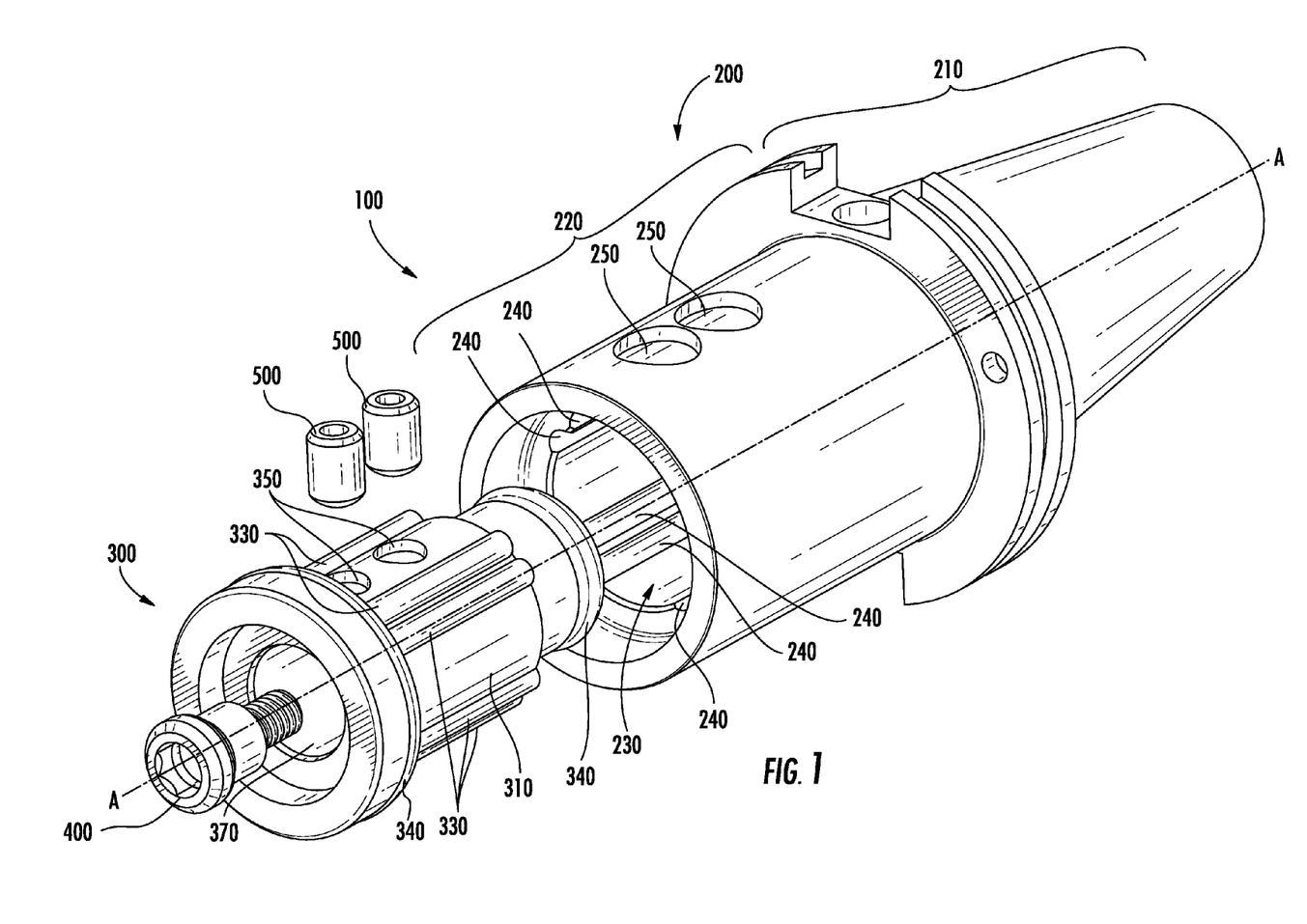
FIG. 1 illustrates an exploded view of one embodiment of a tool holder assembly described herein.
Figure 2:
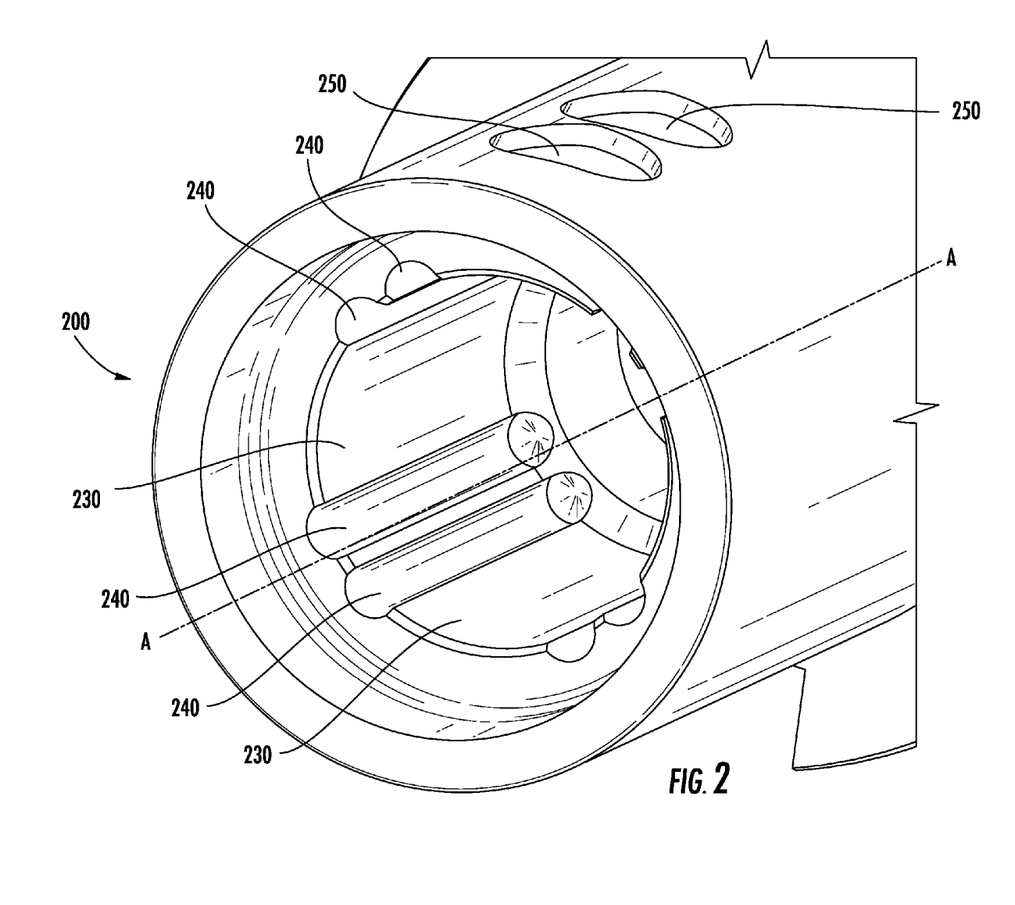
FIG. 2 illustrates a sectional view of the tool holder body of FIG. 1.
Figure 3A:
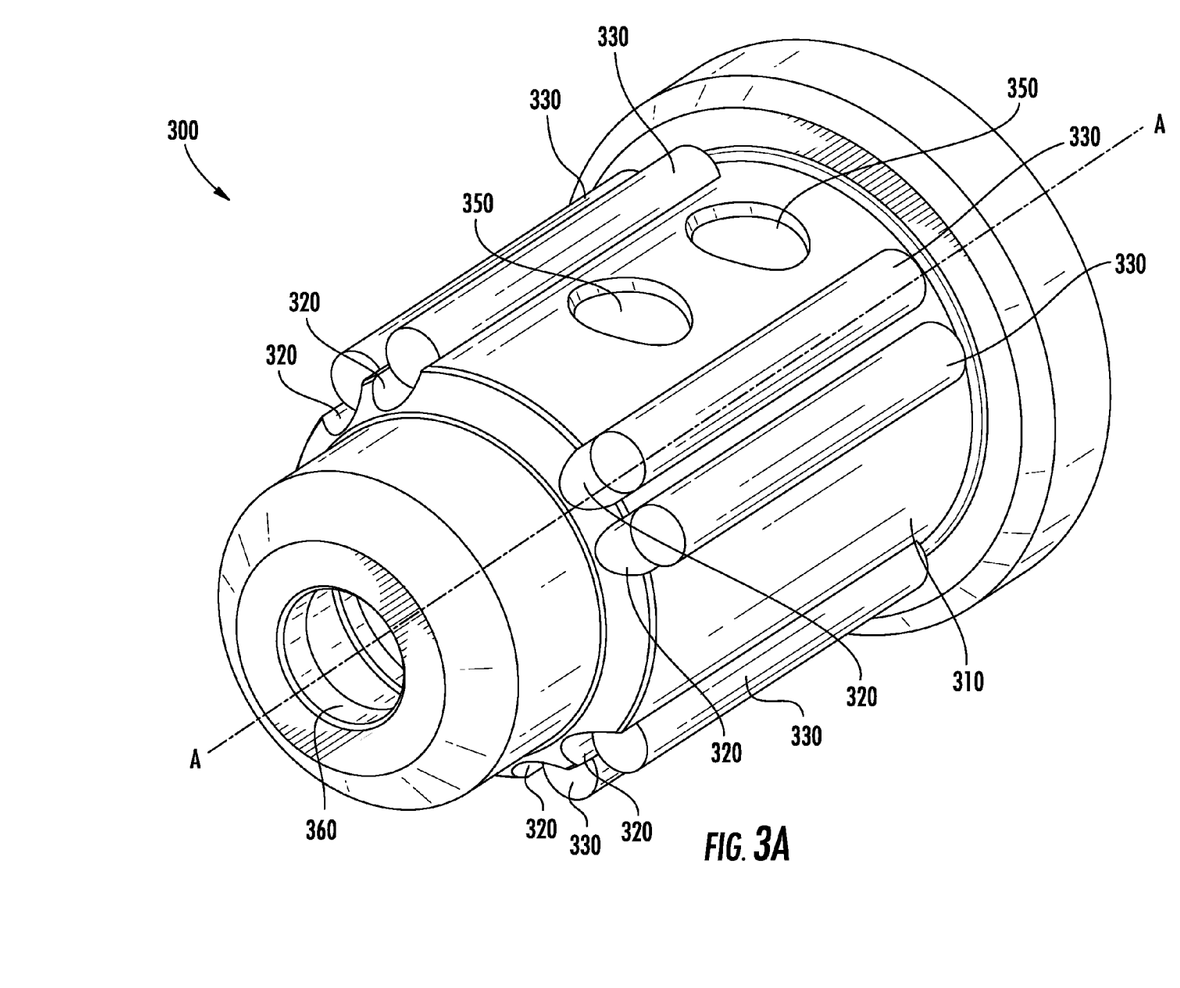
FIG. 3A illustrates a perspective view of a connector portion and dampening elements according to one embodiment of a tool holder assembly described herein.
Figure 3B:
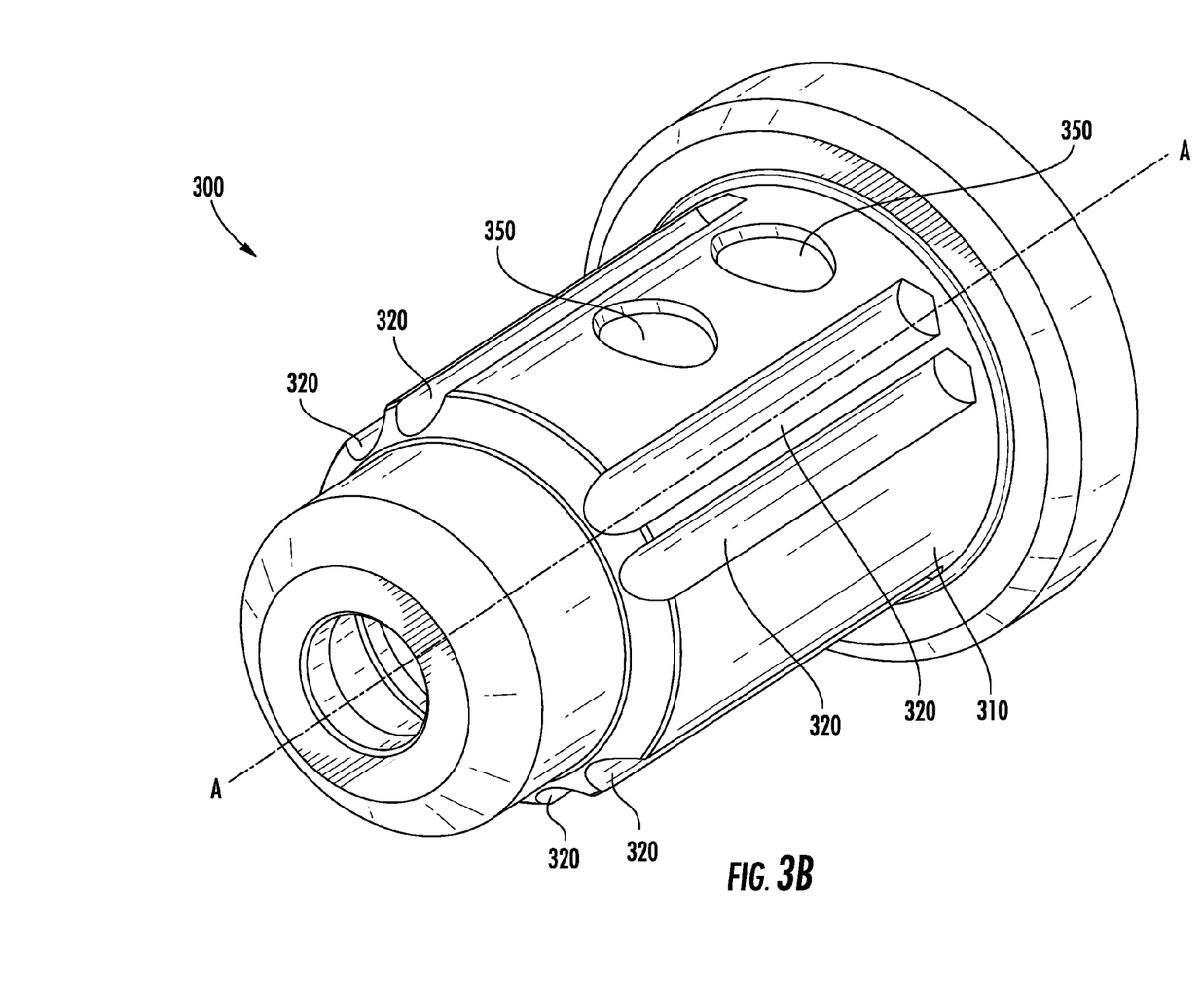
FIG. 3B illustrates a perspective view of a connector portion according to one embodiment of a tool holder assembly described herein.

Referring now to FIGS. 1-3, there is illustrated a tool holder assembly, generally designated as reference number 100, in accordance with one embodiment described herein. As provided in FIG. 1, the tool holder assembly (100) defines a central longitudinal axis (A-A) and comprises a tool holder body (200) and a tool receiver (300). The tool holder body (200) has a connector portion (210) and a holder portion (220), the connector portion (210) is structured to engage a rotary machine (not shown) and the holder portion (220) is disposed opposite the connector portion (210) and has an inner diameter surface (230) comprising a plurality of axial grooves (240). The tool receiver (300) is structured to receive at least a portion of a cutting tool (not shown), the tool receiver (300) having an outer diameter surface (310) comprising a plurality of axial grooves (320). The tool receiver (300) is mounted in the holder portion (220) so as to align the axial grooves (240) of the inner diameter surface (230) with the axial grooves (320) of the outer diameter surface (310) and define axial sleeves filled with dampening elements (330).

Tool holder bodies can have any shape or configuration not inconsistent with the objectives of the present invention. For example, a connector portion (210) of a tool holder body (200) can be structured or configured to engage a rotary machine in any manner. In some embodiments, as in FIG. 1, the connector portion (210) can be generally cylindrical, conical or frustoconical and can be structured or configured to engage a rotary machine by interference fit, resistance fit, or by clamping such as by a hydraulic clamp. In certain other embodiments, the connector portion (210) may be structured or configured to be mechanically fastened or affixed to a rotary machine, such as by a bolt, pin or other fastener.

Similarly, the holder portion (220) can have any shape, architecture or configuration not inconsistent with the objectives of the present invention. In the embodiments illustrated in FIGS. 1 and 2, the holder portion (220) is generally cylindrical, although other shapes are contemplated by the present disclosure. For example, in some cases, the holder portion (220) can have a polygonal cross-sectional shape. The holder portion (220) defines an inner diameter surface (230). The inner diameter surface (230) can be sized, shaped, or otherwise configured in any manner not inconsistent with the objectives of the present invention. For example, as illustrated in FIGS. 1 and 2, the inner diameter surface (230) can be substantially cylindrical, although other geometries, such as polygonal, are also contemplated. The holder portion (220) comprises a plurality of axial grooves (240). The axial grooves (240) can have any size, shape, orientation, or configuration consistent with the disclosure of axial sleeves provided herein below. Further, the holder portion (220) can accommodate one or more locking pins or bolts for securing a cutting tool into position within the tool holder assembly (100). In the embodiments illustrated in FIGS. 1 and 2, for example, the holder portion (220) comprises at least two radial apertures (250) configured to receive corresponding radial locking pins or screws (500) for cutting tool securement. Additionally, the tool holder body (200) can comprise an axial aperture (not shown) configured to receive a corresponding axial clamp screw (400). The axial clamp screw (400) passes through an aperture formed in the tool receiver (300) and threadingly engages the axial aperture in the tool holder body (200).

A tool holder assembly described herein further comprises a tool receiver. Tool receivers (300) are structured to receive at least a portion of a cutting tool. In the embodiment of FIG. 1, a receiver surface (370) is provided of a size and/or shape corresponding to the desired cutting tool. The receiver surface (370) may have any desired size, shape or configuration. For example, in some embodiments, as in FIG. 1, the receiver surface (370) may have a substantially circular cross-sectional shape. In certain other cases, a polygonal cross-section can be employed. In further embodiments, the receiver surface (370) may have one or more linear portions or cut-out portions operable as a key, thereby permitting insertion of the cutting tool in only one or a limited number of rotational configurations. The receiver surface (370) may also have a diameter of sufficient size to permit one or more axial clamp screws (400) to be secured through an axial locking aperture (360) as illustrated in FIG. 3A, thereby permitting the tool receiver (300) to be coupled to the tool holder body (200).

A tool receiver (300) can be configured to lockingly engage or otherwise restrict motion of the cutting tool, such as by one or more radial locking pins (500). As illustrated in FIG. 1, the tool receiver (300) comprises at least two radial apertures (350) configured to receive radial locking pins (500), the radial apertures (350) corresponding to the apertures (250) of the tool holder portion (220) when assembled. In some embodiments, the radial locking pins (500) are of sufficient length to additionally restrict motion between the tool receiver (300) and holder portion (220).

The tool receiver (300) has an outer diameter surface (310) comprising a plurality of axial grooves (320) as illustrated in FIGS. 3A and 3B. In some embodiments, the outer diameter surface (310) is sized and/or shaped in a manner corresponding to the inner diameter surface (230). For example, in some cases, the outer diameter surface (310) is substantially the same shape as the inner diameter surface (230) of the holder portion (220). Further, the outer diameter surface (310) can have a diameter or cross-sectional width such that the tool receiver (300) can be inserted into the holder portion (220) without the outer diameter surface (310) contacting the inner diameter surface (230).

The tool receiver (300) is configured to be mounted in the holder portion (220) so as to align the axial grooves (240) of the inner diameter surface (230) with the axial grooves (320) of the outer diameter surface (310) to define axial sleeves. Axial sleeves formed by axial grooves (240, 320) can have any desired cross-sectional shape. For example, in some cases, the axial sleeves have a circular or elliptical cross-sectional profile. In certain other embodiments, the axial sleeves have a polygonal cross-sectional profile.

In some cases, axial grooves (240) of the inner diameter surface (230) are of different cross-sectional profile than the axial grooves (320) of the outer diameter surface (310). For example, at least one axial groove can have a substantially semi-circular cross-section, with the opposing axial groove having a polygonal cross-section. In other cases, axial grooves (240, 320) of the inner and outer diameter surfaces (230, 310) are of the same cross-sectional profile. In one such embodiment, each axial groove forming the axial sleeve can have a semi-circular cross-sectional profile, resulting in a cylindrical axial sleeve.

Figure 4:
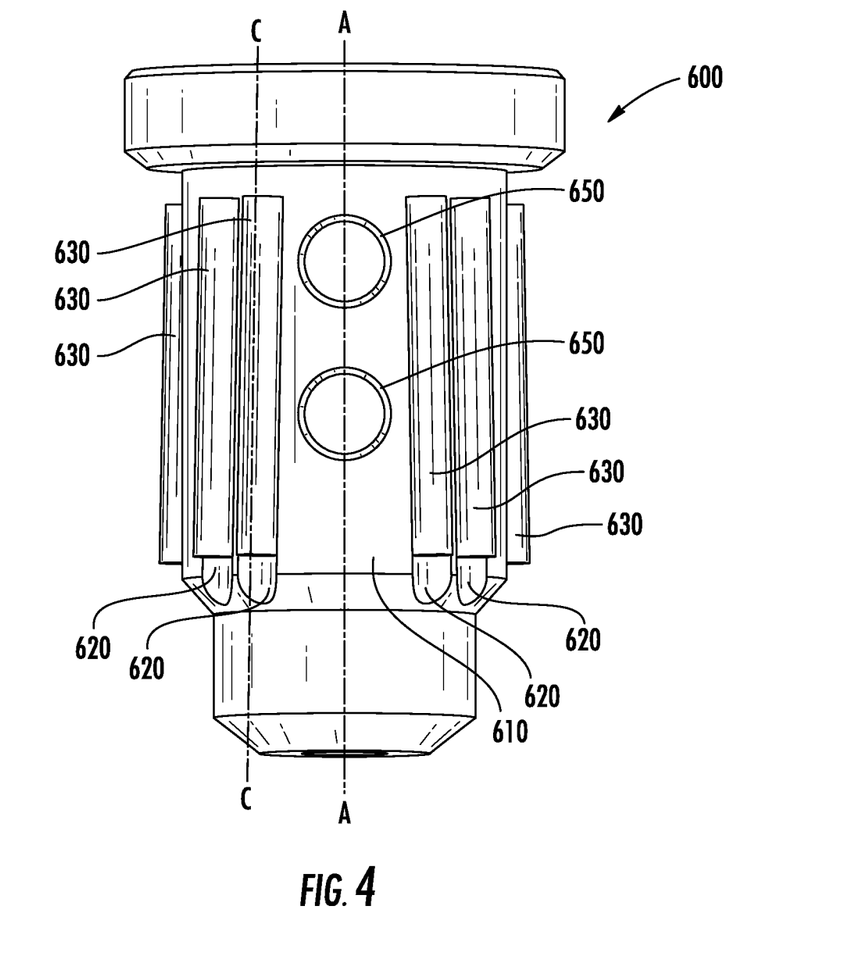
FIG. 4 illustrates an elevational view of a connector portion according to one embodiment of a tool holder assembly described herein.

In addition, the axial grooves (240) of the inner diameter surface (230) and the axial grooves (320) of the outer diameter surface (310) forming the axial sleeves can be arranged and/or oriented in any manner. The axial grooves (240, 320), in some embodiments, are parallel or substantially parallel with a central longitudinal axis (A-A) of the tool holder assembly. In certain other cases, the axial grooves (240) of the inner diameter surface (230) and/or the axial grooves (320) of the outer diameter surface (310) are not parallel to the central longitudinal axis. Such an embodiment is illustrated in FIG. 4, which depicts axial grooves (620) disposed on the outer diameter surface (610) having a central axis (C-C) non-parallel to the central longitudinal axis (A-A). Further, the axial grooves (240) of the inner diameter surface (230) and the axial grooves (320) of the outer diameter surface (310) may be positioned to provide axial sleeves having any desired radial arrangement. In certain embodiments, the axial grooves (240, 320) may be arranged generally helically about the outer diameter surface and/or inner diameter surface. Corresponding dampening elements disposed in the axial grooves (240, 320) can be similarly arranged. Such embodiments may operate to enact axial movement of the cutting tool when torque is applied to the tool holder assembly, thus moving the cutting tool axially away from a workpiece being machined, reducing feed and torque. In some embodiments, the axial grooves (240, 320) are positioned to provide axial sleeves having a symmetrical radial arrangement about the central longitudinal axis (A-A), as illustrated in FIGS. 3A and 3B. Alternatively, the axial grooves (240, 320) of the inner and outer diameter surfaces (230, 310) are positioned to provide sleeves having an asymmetrical radial arrangement about the central longitudinal axis (A-A).

In some embodiments, the number of axial grooves (320) on an outer diameter surface (310) can correspond to the number of axial grooves (240) on an inner diameter surface (230). In other embodiments, the number of axial grooves (320) on an outer diameter surface (310) differs from the number of axial grooves (240) on an inner diameter surface (230). Such an arrangement can permit selection of a number of axial sleeves to be utilized for a particular tool receiver (300), permitting interchangeability of different tool receivers (300) with a single tool holder (200).

Figure 5:
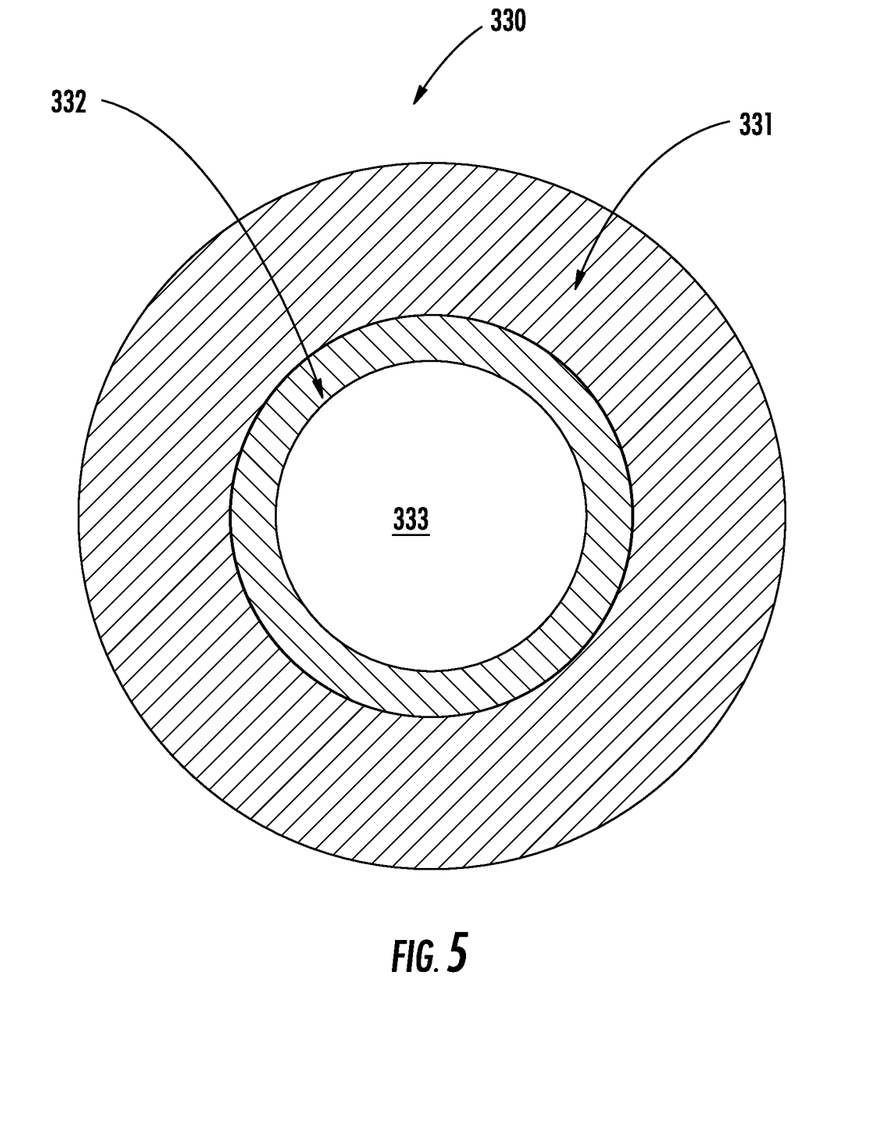
FIG. 5 illustrates a cross-sectional view of a dampening element according to one embodiment of a tool holder assembly described herein
Figure 6:
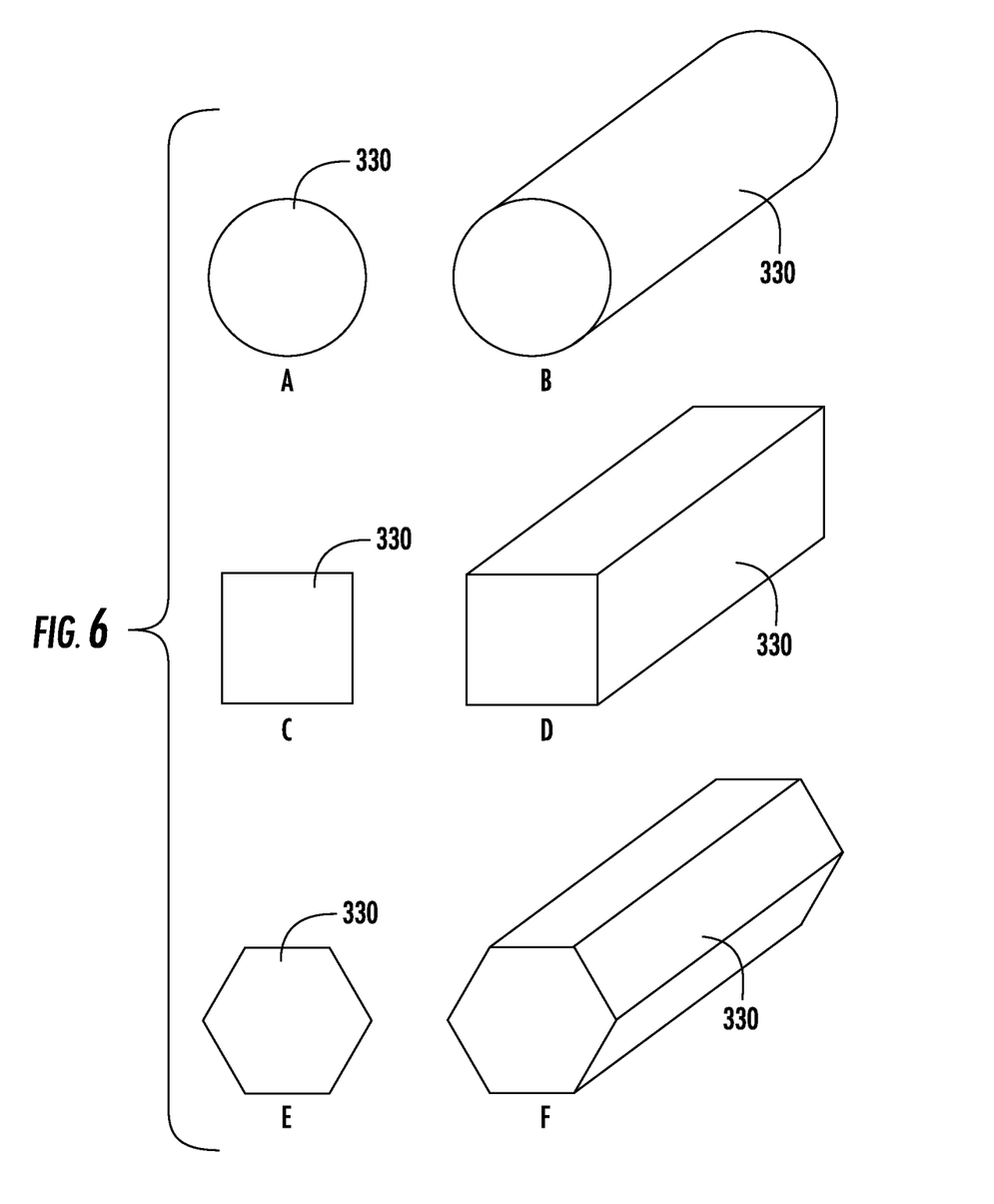
FIG. 6A illustrates a cross-sectional view of a dampening element according to one embodiment of a tool holder assembly described herein having a circular cross-sectional shape.
FIG. 6B illustrates a perspective view of the dampening element of FIG. 6A.
FIG. 6C illustrates a cross-sectional view of a dampening element according to one embodiment of a tool holder assembly described herein having a square cross-sectional shape.
FIG. 6D illustrates a perspective view of the dampening element of FIG. 6C.
FIG. 6E illustrates a cross-sectional view of a dampening element according to one embodiment of a tool holder assembly described herein having a hexagonal cross-sectional shape.
FIG. 6F illustrates a perspective view of the dampening element of FIG. 6E.

Axial sleeves formed by aligned axial grooves are filled with dampening elements. Dampening elements (330) are illustrated in FIGS. 1, 3A and 3B. "Filled," for reference purposes herein, refers to a configuration whereby dampening elements are disposed within axial sleeves and take up all or substantially all of a cross-sectional profile formed by such sleeves. In some such embodiments, axial sleeves do not comprise or contain components or elements in addition to the dampening elements. Any number of dampening elements can be used. For example, in some cases, all or substantially all of the axial sleeves formed by axial grooves (240, 320) are filled with dampening elements (330). In other cases, less than all axial sleeves are filled with dampening elements (330). Dampening elements (330) can be formed by any material not inconsistent with the objectives of the present invention. In some cases, a dampening element can be formed from an elastomer, plastic, or other material softer than the adjacent inner and outer diameter surfaces (230, 310). For example, a dampening element (330) can comprise, consist or consist essentially of neoprene, nitrile-butadiene, polyisoprene, a fluoroelastomer, rubber, silicone and/or combinations thereof. Further, in some embodiments, dampening elements (330) have a core or central portion faulted from a material that is not elastomeric. For example, dampening elements (330) can have an inner portion (332) formed in part or entirely from metal or rigid plastic. In certain embodiments. For example, FIG. 5 illustrates a dampening element (330) comprising an outer portion (331) formed from an elastomer, plastic, or other material softer than the adjacent inner and outer diameter surfaces (230, 310). The inner portion (332) of the dampening element (330) of FIG. 5 is formed from a rigid component, for example faulted of metal or plastic. The embodiment of FIG. 5 further comprises a hollow or recessed central portion (333), however other embodiments are contemplated in which a rigid component fills spaces indicated in FIG. 5 to include both the inner portion (332) and central portion (333). In embodiments comprising or including a rigid inner portion, the dampening elements (330) can demonstrate increased capability for torque transmission applied to the tool holder assembly.

Dampening elements can be encapsulated by, fastened to, and/or contained within axial sleeves in any manner or by any means not inconsistent with the objectives of the present invention. In some cases, dampening elements (330) are not mechanically fastened to the axial grooves (240, 320) of the outer diameter surface (310) or the inner diameter surface (230). In such embodiments, the dampening elements (330) can be held in position within the axial sleeves primarily or entirely by frictional fit or compression. In certain other embodiments, the dampening elements (330) may be fastened or connected to the axial sleeves by an adhesive.

In some configurations of a tool holder assembly (100) described herein, one or more of the inner diameter surface (230), outer diameter surface (310), and/or dampening elements (330) are sized, shaped, or otherwise configured such that the dampening elements (330) prevent contact of the tool receiver (300) and holder portion (220). For example, axial grooves (320) on the outer diameter surface (310) and/or axial grooves (240) on the inner diameter surface (230) can each define a cross-sectional size less than 50% of the cross-sectional size of the dampening elements (330), thereby permitting the dampening elements (330) to prevent surface contact of the tool receiver (300) and holder portion (220). While the above description provides one embodiment of a configuration wherein dampening elements prevent contact of the tool receiver and holder portion, it is to be understood that other configurations are also possible. In such configurations, dampening elements (330) can be operable to dampen vibrational, rotational, and/or axial forces induced during a rotational cutting operation.

In some cases, tool holder assemblies described herein can further comprise at least one secondary dampening element (340) disposed on or about the outer diameter surface (310). In some embodiments, a secondary dampening element can be circular or substantially circular, and can be disposed about the central longitudinal axis (A-A). Secondary dampening elements are, in some embodiments, operable to prevent contact of the tool receiver (300) and the connector portion (220) in at least an axial direction. In some cases, secondary dampening elements are operable to dampen vibrational, rotational, and/or axial forces induced during a rotational cutting operation.

II. Methods of Assembling a Tool Holder

In another aspect, methods of assembling a tool holder having a central longitudinal axis are described herein. A method described herein comprises providing a tool holder body having a connector portion and a holder portion. The connector portion is structured to engage a rotary machine, and the holder portion is disposed opposite the connector portion and has an inner diameter surface comprising a plurality of axial grooves. A tool receiver structured to receive at least a portion of a cutting tool is provided, the tool receiver having an outer diameter surface comprising a plurality of axial grooves. The tool receiver is mounted in the holder portion so as to align the axial grooves of the inner and outer diameter surfaces and define axial sleeves, wherein the axial sleeves are filled with dampening elements.

Any tool holder assembly can be used consistent with the above description in Section I. For example, axial grooves of the outer diameter surface and associated dampening elements can be parallel to the central longitudinal axis, as illustrated in FIGS. 1, 3A, and 3B. In other cases, the axial grooves of the outer diameter surface and associated dampening elements are not parallel to the central longitudinal axis, as illustrated in FIG. 4. In certain embodiments, the dampening elements may be arranged generally helically about the outer diameter surface and/or inner diameter surface. Corresponding axial grooves can be similarly arranged so as to receive the dampening elements. In such embodiments, dampening elements may operate to enact axial movement of the cutting tool when torque is applied to the tool holder assembly. Such axial movement may be operable to move the cutting tool axially away from a workpiece being machined, thus reducing feed and torque. Consistent with the above description of dampening elements in Section I above, the dampening elements, in some embodiments, are not mechanically fastened to the axial grooves of the outer diameter surface. Further, axial grooves can be formed on the outer diameter surface so as to be symmetrical or substantially symmetrical to the axial grooves of the inner diameter surface. The axial sleeves can have a circular, elliptical, or polygonal cross-sectional profile.

Individual steps of methods described herein can be carried out in any manner not inconsistent with the objectives of the present invention. In some embodiments, mounting the tool receiver in the holder portion can comprise filling the axial sleeves with dampening elements by positioning the dampening elements into the axial grooves of the outer diameter surface prior to mounting the tool receiver in the holder portion. In certain cases, the axial sleeves are filled with the dampening elements by positioning the dampening elements in the axial grooves of the inner diameter surface prior to mounting the tool receiver in the holder portion.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A tool holder assembly having a central longitudinal axis and comprising:
   a tool holder body having a connector portion and a holder portion, the connector portion structured to engage a rotary machine and the holder portion disposed opposite the connector portion and having an inner diameter surface comprising a plurality of axial grooves; and
   a tool receiver structured to receive at least a portion of a cutting tool, the tool receiver having an outer diameter surface comprising a plurality of axial grooves, wherein the tool receiver is mounted in the holder portion so as to align the axial grooves of the inner and outer diameter surfaces and define axial sleeves filled with dampening elements.

2. The tool holder assembly of claim 1, wherein the dampening elements are not mechanically fastened to the axial grooves of the outer diameter surface or the inner diameter surface.

3. The tool holder assembly of claim 1, wherein the axial grooves of the outer diameter surface and the dampening elements contacting the axial grooves of the outer diameter surface are parallel with the central longitudinal axis.

4. The tool holder assembly of claim 1, wherein the axial grooves of the outer diameter surface and the dampening elements contacting the axial grooves of the outer diameter surface are not parallel to the central longitudinal axis.

5. The tool holder assembly of claim 1, wherein the axial grooves of the outer diameter surface are substantially symmetrical to the axial grooves of the inner diameter surface.

6. The tool holder assembly of claim 5, wherein the axial sleeves have a circular or elliptical cross-sectional profile.

7. The tool holder assembly of claim 5, wherein the axial sleeves have a polygonal cross-sectional profile.

8. The tool holder assembly of claim 1, wherein the dampening elements prevent contact of the tool receiver and holder portion.

9. The tool holder assembly of claim 1, wherein the axial sleeves have a symmetrical radial arrangement around the central longitudinal axis.

10. The tool holder assembly of claim 1, wherein the tool receiver is coupled to the tool holder body by an axial clamp screw which passes through an aperture formed in the tool receiver and threadingly engages a threaded aperture in the tool holder body.

11. The tool holder assembly of claim 1, wherein the dampening elements are formed of an elastomeric material.

12. The tool holder assembly of claim 11, wherein the dampening elements comprise an inner portion formed from metal.

13. A method of assembling a tool holder having a central longitudinal axis comprising:
   providing a tool holder body having a connector portion and a holder portion, the connector portion structured to engage a rotary machine and the holder portion disposed opposite the connector portion and having an inner diameter surface comprising a plurality of axial grooves;
   providing a tool receiver structured to receive at least a portion of a cutting tool, the tool receiver having an outer diameter surface comprising a plurality of axial grooves;
   mounting the tool receiver in the holder portion so as to align the axial grooves of the inner and outer diameter surfaces and define axial sleeves, wherein the axial sleeves are filled with dampening elements.

14. The method of claim 13, wherein the axial sleeves are filled with the dampening elements by positioning the dampening elements in the axial grooves of the outer diameter surface prior to mounting the tool receiver in the holder portion.

15. The method of claim 14, wherein the axial grooves of the outer diameter and associated dampening elements are parallel to the central longitudinal axis.

16. The method of claim 14, wherein the axial grooves of the outer diameter and associated dampening elements are not parallel to the central longitudinal axis.

17. The method of claim 14, wherein the dampening elements are not mechanically fastened to the axial grooves of the outer diameter surface.

18. The method of claim 13, wherein the axial sleeves are filled with the dampening elements by positioning the dampening elements in the axial grooves of the inner diameter surface prior to mounting the tool receiver in the holder portion.

19. The method of claim 13, wherein the axial grooves of the outer diameter surface are substantially symmetrical to the axial grooves of the inner diameter surface.

20. The method of claim 19, wherein the axial sleeves have a circular, elliptical or polygonal cross-sectional profile.

21. A tool holder assembly having a central longitudinal axis and comprising:
   a tool holder body having a connector portion and a holder portion, the connector portion structured to engage a rotary machine and the holder portion disposed opposite the connector portion and having an inner diameter surface comprising a plurality of axial grooves; and a tool receiver structured to receive at least a portion of a cutting tool, the tool receiver having an outer diameter surface comprising a plurality of axial grooves, wherein the tool receiver is mounted in the holder portion so as to align the axial grooves of the inner and outer diameter surfaces and define axial sleeves filled with dampening elements, wherein the axial grooves of the outer diameter surface and the dampening elements contacting the axial grooves of the outer diameter surface are not parallel to the central longitudinal axis; and wherein the axial grooves of the outer diameter surface and the dampening elements contacting the axial grooves of the outer diameter surface are arranged generally helically about the central longitudinal axis.

* * * * *